June 29, 1948.    G. W. WHITEMAN    2,444,214
ROD LINE SHACKLE
Filed Aug. 14, 1945    2 Sheets-Sheet 1
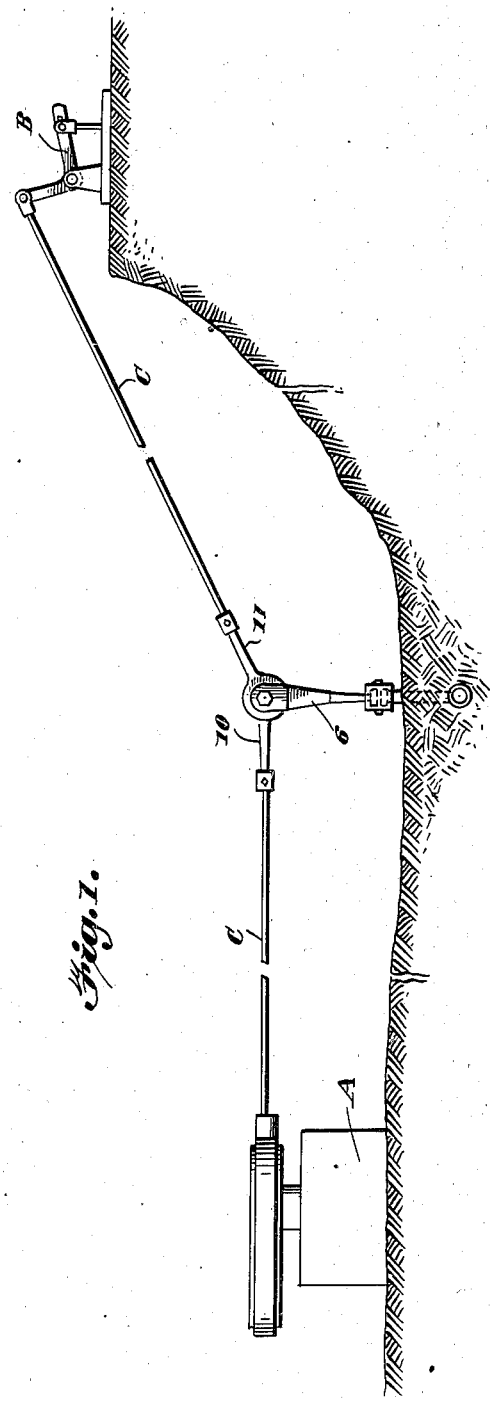
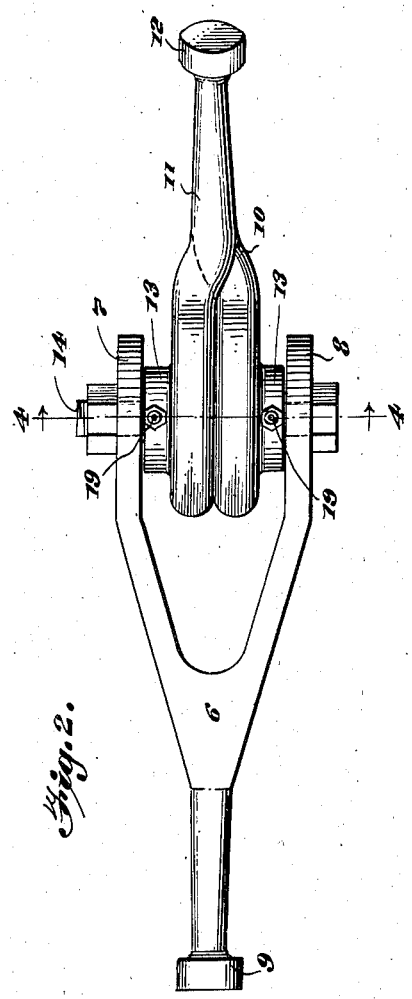
Inventor
GEORGE W. WHITEMAN
By [signature]
Attorney June 29, 1948.   G. W. WHITEMAN   2,444,214
ROD LINE SHACKLE
Filed Aug. 14, 1945   2 Sheets-Sheet 2
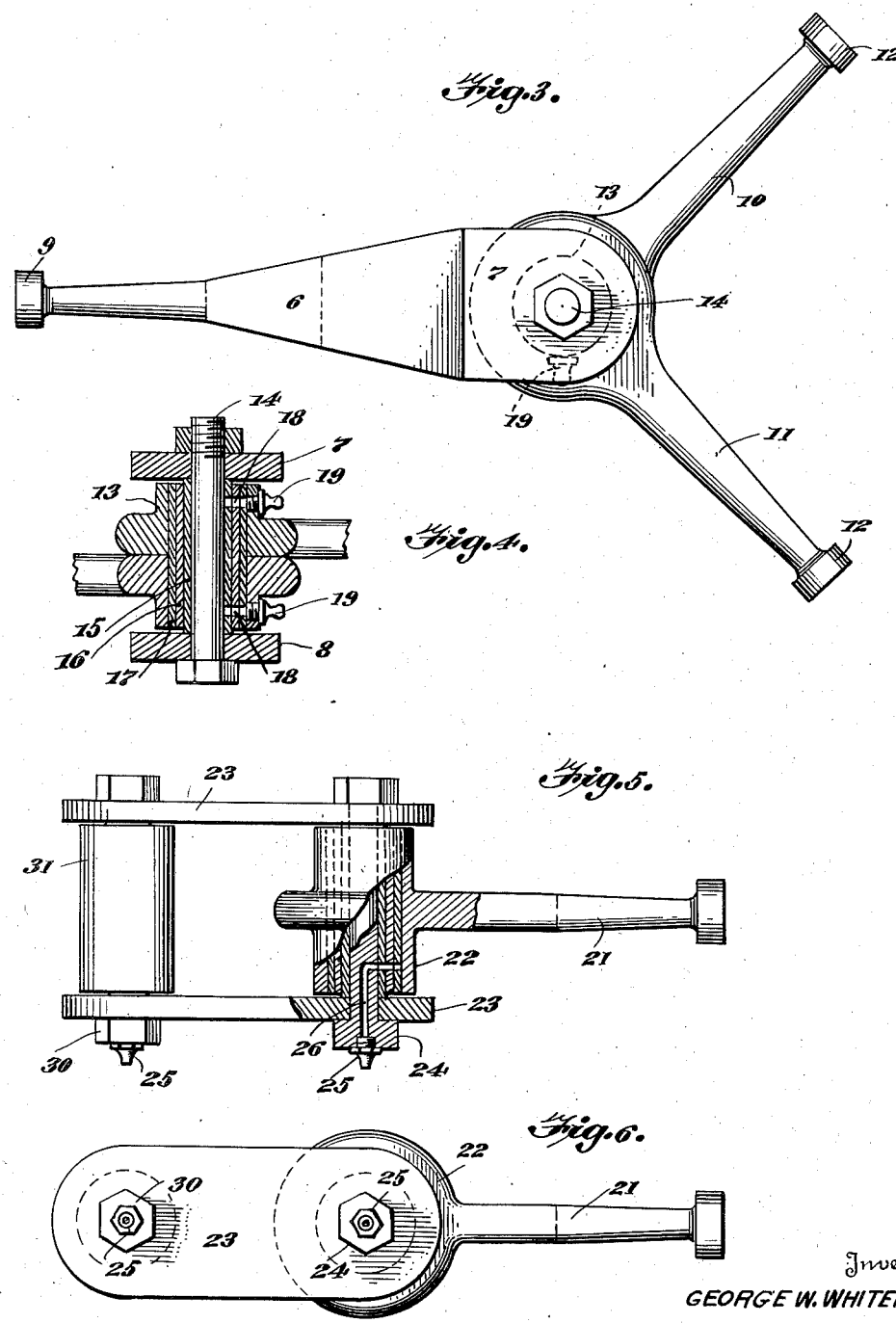
Inventor
GEORGE W. WHITEMAN
By
Attorney Patented June 29, 1948

2,444,214

UNITED STATES PATENT OFFICE 2,444,214

ROD LINE SHACKLE

George W. Whiteman, Pittsburgh, Pa.

Application August 14, 1945, Serial No. 610,849

3 Claims. (Cl. 74—522.5)

This invention relates to what are known in the well pumping art as rod line shackles or connections, used in connecting and transmitting power from a suitable motor or power plant to one or more well jacks or pumps for the purpose of operating the latter. It is customary or common in the art to connect the power driven element (often an eccentric and its strap) to several pumps for the purpose of operating all or some of them from the same source of power. These connections are effected by means of rod lines which are usually sectional or jointed and provided with devices for transmitting the pull or reciprocation at an angle, or in an angular line, made necessary by the location of the power with respect to the pumps or with respect to local conditions, such for example as an intervening road across which the rod line has to be elevated, or in consequence of variations in level between the pumps and the power, as on hillsides or the like. These variations have been accommodated in various ways, such as by rings, hooks or other connectors or linkage systems. For various reasons these devices have been unsatisfactory, usually because of excessive wear incident to the absence of any means for lubrication; and the wear is excessive under such conditions because of the constant and long continued motion.

The object of the present invention is to provide a lubricated shackle which may have various form or adaptations and which can be greased as occasion demands by any system of lubrication, preferably of the force feed type, in which the lubricant is forced in through a hollow plug by a "gun" or device.

As stated the invention may be applied to various form of shackles, some of which are illustrated in the accompanying drawings in which:

Fig. 1 is a diagram illustrating a simple form of rig in which the rod line shackles are used;

Fig. 2 is an enlarged elevation of one form of shackle, known as a three-way shackle for transmitting the motion referred to at an angle;

Fig. 3 is a plan view of the same;

Fig. 4 is a section on the line 4—4 of Fig. 2;

Fig. 5 is a plan of what is known as a combination shackle used adjacent to or in connection with the power eccentric;

Fig. 6 is a side elevation of Fig. 5.

Referring particularly to the drawings A indicates a power plant of any known or suitable type and B indicates a pump jack or bell crank lever to which motion is communicated from the motor by the rod lines C. It will be understood that, as stated, several pumps may be connected to the same power, but as this is well known in the art illustration thereof is believed to be unnecessary, since the invention relates to shackles for connecting the rod lines to the motor, the pump jack or to each other.

The three-way swing shackle illustrated in the Figures 2 to 4 comprises a forked member 6, the forks of which are indicated at 7 and 8 and the shank of the member 6 is tapered to a head 9 to receive any suitable sort of clamp or connection whereby it may be anchored against pulling away, as by a fixture embedded in the ground while permitting it to swing back and forth in consequence of the operation of the rod lines C. Between the forks 7 and 8 the shackle member receives the loops of a pair of members 10 and 11 which have heads 12 for the connection of the sectional rod lines C. The loops or hubs 13 of the swinging members 10 and 11 are connected to the forks 7 and 8 by a bolt 14 extending through the same, and a lubricated bearing is formed by three sleeves enclosed in the hubs 13, between said hub and the bolt. The inner sleeve is indicated at 15, and is slightly longer than the adjacent sleeves, so that when the bolt is tightened the inner sleeve is clamped at its ends between the forks. It will readily be seen that the respective sides 7 and 8 of the forked member 6 could be recessed adjacent their inner sides and thus accommodate the opposite end of the inner bearing or sleeve 15. Surrounding the sleeve 15 is an intermediate sleeve 16 and surrounding the latter is an outer sleeve 17. These sleeves are perforated as indicated at 18 to pass grease under pressure from nipples 19 tapped into the hubs of the members 13 to which a grease gun coupling may be applied for the purpose of forcing grease into the bearing formed by the sleeves. Accordingly the joint can be lubricated as desired or required. It is of course possible when desirable to increase the number of clevis or forked members 6 to two instead of one as illustrated.

A number of such swing shackles may be used according to the number of angles or turns in the rod line transmission from the power to the pump. Thus the adjacent ends of the rod line sections are connected to the members 10 and 11 and as the rod line is reciprocated the members 6, 10 and 11 will swing in the direction and to the extent demanded by the movement. Thus in conforming to different heights or inclinations of the ground, or in overpassing a road, several of the shackles will be used at the various angles between the rod sections, and the throw at each joint can be varied by increasing or decreasing the length of the connections to the standing member 6 and by different angular variations in the members or arms 10 and 11, ranging from a straight line movement to an acute angle movement. The movement however will be transmitted between the rod line sections, and the shackle can be set vertically or horizontally or otherwise according to conditions.

Another form of the invention is illustrated in Figures 5 and 6. In this form there is a single swinging arm 21 the hub 22 of which encloses the three bearing sleeves referred to above and is held between swinging links 23 by a bolt 24, the bolt being bored lengthwise as indicated at 26 to receive a nipple 25 for the grease gun connections, the sleeves being perforated and the bore 26 opening into the inner sleeve to allow the lubricant to pass from one sleeve to another and lubricate the bearing surfaces. The links 23 are connected by a bolt 30 to a roller 31 which may be used on or applied to the eccentric strap of the power plant and which is also provided with the lubricating devices as above described.

Or, instead of roller 31 the arms 10 and 11 may be substituted to form a double jointed connection which can be used under certain conditions.

It will of course be understood that instead of using the double shackles 10 and 11, that it is within the scope of the invention to remove these two shackles and substitute therefor a single or a one-piece shackle and thereby produce what is known as a two-way shackle.

As stated the invention may be included in various assemblies, all retaining the idea of a shackle with lubricating means including therein for the purpose of preventing wear and at the same time transmitting the power or movement with much less loss due to friction and other causes than is met with in the ordinary devices used for this purpose.

A further feature of advantage is that when the joint becomes worn it can be cheaply and quickly renewed by separating the joint, taking out the worn sleeve or sleeves and inserting new ones. This can be done at much less cost than substituting an entirely new connection.

I claim:

1. A three-way swing connection for rod lines, comprising a main swinging member having a fork, a pair of swinging arms fitting between the forks, a pivot bolt extending through the fork and the arms, three concentric bearing sleeves surrounding the bolt, the inner sleeve being slightly longer than the others, each of said member and arms being free to swing to various angles with respect to each other.

2. A three-way swing connection for rod lines as in claim 1, the said member and each of said arms having a head at its outer end to receive a coupling.

3. A rod line connection comprising a plurality of members and a connecting bolt extending through the same, three concentric bearing sleeves surrounding the bolt, the inner sleeve being slightly longer than the others, and means to supply lubricant to the surfaces of the sleeves.

GEORGE W. WHITEMAN.

REFERENCES CITED

The following references are of record in the file of this patent:

UNITED STATES PATENTS

| Number | Name | Date |
|---|---|---|
| 1,431,304 | Hensley | Oct. 10, 1922 |
| 2,194,931 | Finch | Mar. 26, 1940 |
| 2,195,336 | Loop | Mar. 26, 1940 |
| 2,307,657 | Anderson | Jan. 5, 1943 |